(12) United States Patent
Ito

(10) Patent No.: US 11,699,311 B2
(45) Date of Patent: Jul. 11, 2023

(54) STORAGE MEDIUM STORING ANOMALY DETECTION PROGRAM, ANOMALY DETECTION METHOD, AND ANOMALY DETECTION APPARATUS

(71) Applicant: FUJITSU LIMITED, Kawasaki (JP)

(72) Inventor: Toshio Ito, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 406 days.

(21) Appl. No.: 17/132,275

(22) Filed: Dec. 23, 2020

(65) Prior Publication Data

US 2021/0248847 A1    Aug. 12, 2021

(30) Foreign Application Priority Data

Feb. 6, 2020    (JP) ................... 2020-018926

(51) Int. Cl.
*G07C 5/08* (2006.01)
*G06N 5/02* (2023.01)
*G06N 20/00* (2019.01)

(52) U.S. Cl.
CPC ............. *G07C 5/0841* (2013.01); *G06N 5/02* (2013.01); *G06N 20/00* (2019.01)

(58) Field of Classification Search
CPC .... G07C 5/0841; G07C 5/008; G07C 5/0808; G06N 5/02; G06N 20/00; G06N 20/10
See application file for complete search history.

(56) References Cited

U.S. PATENT DOCUMENTS

| | | | | |
|---|---|---|---|---|
| 11,163,277 B2* | 11/2021 | Kawanoue | ............. | G05B 17/02 |
| 11,308,408 B2* | 4/2022 | Park | ...................... | G06N 20/20 |
| 11,435,736 B2* | 9/2022 | Klos | .................. | G05B 23/0264 |
| 2012/0041575 A1* | 2/2012 | Maeda | ................. | G05B 23/024 |
| | | | | 700/79 |
| 2013/0282336 A1* | 10/2013 | Maeda | ................... | G05B 23/02 |
| | | | | 702/184 |
| 2015/0160098 A1* | 6/2015 | Noda | .................... | G01M 99/00 |
| | | | | 702/35 |
| 2021/0166155 A1* | 6/2021 | Ito | ...................... | G05B 23/0283 |

FOREIGN PATENT DOCUMENTS

| | | |
|---|---|---|
| JP | 2004-118658 A | 4/2004 |
| JP | 2007-198918 A | 8/2007 |
| JP | 2015-088079 A | 5/2015 |
| JP | 2018-190128 A | 11/2018 |

* cited by examiner

*Primary Examiner* — Sizo B Vilakazi
(74) *Attorney, Agent, or Firm* — Fujitsu Patent Center

(57) ABSTRACT

An anomaly of a moving object is detected by using a regression function according to k-nearest-neighbor crossover kernel regression. The regression function is configured to derive an estimation value for a value of a second item from a value of a first item regarding a movement of the moving object. Whether the moving object has an anomaly or not is determined, based on whether a difference between an estimation value of the second item and an actually measured value of the second item is smaller than or equal to a threshold. The estimation value of the second item is derived by the regression function from a value of the first item in the log data having values of the first item and values of the second item, and the actually measured value of the second item is also included in the second log data.

5 Claims, 7 Drawing Sheets

STORAGE MEDIUM STORING ANOMALY DETECTION PROGRAM, ANOMALY DETECTION METHOD, AND ANOMALY DETECTION APPARATUS

CROSS-REFERENCE TO RELATED APPLICATION

This application is based upon and claims the benefit of priority of the prior Japanese Patent Application No. 2020-18926, filed on Feb. 6, 2020, the entire contents of which are incorporated herein by reference.

FIELD

The embodiment discussed herein is related to a storage medium storing an anomaly detection program, an anomaly detection method, and an anomaly detection apparatus. Hereinafter, those are simply referred to as a detection program, a detection method, a detection apparatus, and the like.

BACKGROUND

There have been known techniques for detecting an anomaly by evaluating, using a threshold, the difference between an estimation value obtained by using a nonlinear regression model and an actually measured value. There has also been known k-nearest-neighbor crossover kernel regression as a technique for increasing the speed of calculating prediction values by kernel regression. In k-nearest-neighbor crossover kernel regression, k nearest neighbors of each piece of learning data are used to calculate a kernel, and thus, the calculation time is expected to be shorter than in the case where all pieces of the learning data are used to calculate a kernel for each piece of the learning data. Japanese Laid-open Patent Publication No. 2004-118658 is an example of related art.

SUMMARY

According to an aspect of the embodiments, an anomaly detection method performed by a computer, the method includes steps of: generating, based on first log data having values of a first item and values of a second item regarding a movement of a moving object, a regression function according to k-nearest-neighbor crossover kernel regression, the regression function being configured to derive an estimation value for a value of the second item from a value of the first item; determining a standard to calculate a specified threshold regarding the estimation value from the value of the first item, based on a confidence-interval width of the estimation value and the regression function for each value of the first item; and judging whether the moving object has an anomaly, based on whether the difference between an estimation value of the second item and an actually measured value of the second item is smaller than or equal to a threshold calculated from the value of the first item based on the standard, the estimation value of the second item having being derived by the regression function from a value of the first item in second log data having values of the first item and values of the second item, the actually measured value of the second item being included in the second log data.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
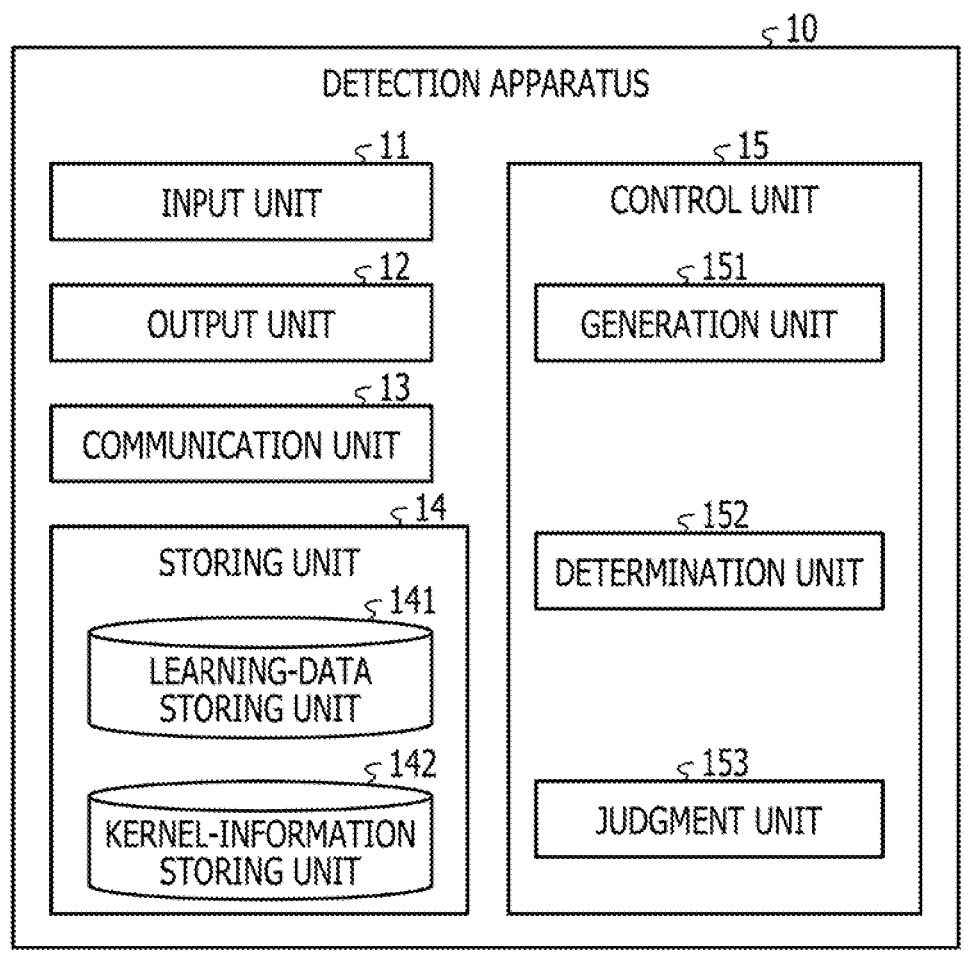
FIG. 1 is a functional block diagram illustrating a functional configuration of a detection apparatus according to an embodiment.

Unfortunately, the anomaly detection technique using the threshold described above has a problem that accuracy in anomaly detection is low in some cases because it is difficult to set an appropriate threshold. For example, in nonlinear regression, there are cases where estimation accuracy is different depending on the region of each variable. For those cases, if the same threshold is set for all regions, for example, in regions where estimation accuracy is high, non-detections tend to occur, but in regions where estimation accuracy is low, false detections tend to occur. This probably makes overall estimation accuracy low.

In one aspect, it is an object to improve accuracy in anomaly detection by setting an appropriate threshold.

Hereinafter, embodiments of a detection program, detection method and detection apparatus according to the present disclosure are described in detail based on the drawings. Note that these embodiments are not intended to limit the present disclosure. These embodiments may be combined as appropriate as far as the combination does not make an inconsistency.

Embodiment

A detection apparatus according to the embodiment performs anomaly detection, for example, based on environmental conditions surrounding a moving object, such as an automobile, aircraft, and ship. Examples of environmental conditions include the variation speed and shape of the medium in a region within a specified distance from the moving object and the amount of remaining power resource of the moving object. Examples of environmental conditions include wind speeds, wind directions, wave speeds, wave heights, the gradients of roads around the position of the moving object as well as the amount of remaining power resource, such as gasoline or battery charge. Such environmental conditions may be considered as a physical model in a continuous system the state of which does not change suddenly due to the environment.

The detection apparatus uses a regression model to output a prediction value, and if the difference between the prediction value and an actually measured value exceeds a threshold, the detection apparatus detects an anomaly. The prediction value and actually measured value may be, for example, on the speed of the moving object, the consumption of the power resource, or the like. Here, environmental conditions and prediction values correspond to explanatory variables and response variables, respectively, in a regression model. Explanatory variables in a regression model may be expressed as a multidimensional vector representing multiple environmental conditions. The detection apparatus employs kernel regression models using kernels.

In learning data, not only environmental conditions and the performance of a moving object but also whether the state of the moving object is anomalous are known data. In prediction data, environmental conditions and the performance of the moving object are known, from which whether the state of the moving object is anomalous is detected. As described above, the distribution of data indicating environmental conditions spreads uniformly and densely.

[Functional Configuration]

The functional configuration of a detection apparatus according to the embodiment is described with reference to FIG. 1. FIG. 1 is a functional block diagram illustrating the functional configuration of the detection apparatus according to the embodiment. As illustrated in FIG. 1, the detection apparatus 10 includes an input unit 11, output unit 12, communication unit 13, storing unit 14, and control unit 15.

The input unit 11 is used by the user to input information. Examples of the input unit 11 include a mouth and a keyboard. The output unit 12 is a display or the like to display screens. The input unit 11 and the output unit 12 may be a touch-panel display.

The communication unit 13 is an interface for data communication with other apparatuses. For example, the communication unit 13 is a network interface card (NIC), which performs data communication via the Internet.

The storing unit 14 is an example of a storing device to store data, programs executed by the control unit 15, and other information, and examples of the storing unit 14 include a hard disk and memory. The storing unit 14 includes a learning-data storing unit 141 and a kernel-information storing unit 142.

The learning-data storing unit 141 stores learning data which indicates combinations of actually measured values of environmental conditions and the performance of the moving object, which values are collected in advance. Learning data is expressed as $(x_i, y_i)$ (i=1, 2, . . . , n), where x is an explanatory variable, and $y_i$ is a response variable. n is the number of pieces of learning data. The variable $x_i$ may be a multidimensional vector.

The kernel-information storing unit 142 stores calculation values or the like that are used in kernel regression. For example, the kernel-information storing unit 142 stores a kernel and confidence-interval width calculated for each piece of the learning data. Note that the method of calculating the kernel and confidence-interval width is described later.

The control unit 15 is implemented, for example, by a central processing unit (CPU), a micro processing unit (MPU), or the like executing a program stored in an internal storing device, using RAM as a work area. The control unit 15 may be implemented, for example, by using an integrated circuit such as an application specific integrated circuit (ASIC) or a field programmable gate array (FPGA). The control unit 15 includes a generation unit 151, a determination unit 152, and a judgment unit 153.

The process executed by the detection apparatus 10 may be divided into a learning phase, a preparation phase, and a detection phase. In the learning phase, the detection apparatus 10 generates kernels to be used for kernel regression functions from learning data. In the preparation phase, the detection apparatus 10 generates functions and the like to be used for anomaly detection using the kernels. In the detection phase, the detection apparatus 10 uses the functions for prediction data to actually perform anomaly detection. In the following, a description is first given of k2 nearest neighbors, then a description of the process for each phase follows.

[k2 Nearest Neighbors]

In this embodiment, input data on the movement of a moving object inputted into the input unit 11 is used as learning data. For example, It may be said that the learning data is an example of the input data. The generation unit 151 uses section data which is a specific number of pieces of data in a section, selected out of the learning data according to an environmental condition used for prediction, to generate a kernel regression function regarding the movement of the moving object. For example, the generation unit 151 generates a kernel regression function by using section data selected from learning data including at least one of the variation speed and the shape of the medium in a region within a specified distance from the moving object and the amount of remaining power resource of the moving object. This section data is referred to as k2 nearest neighbors.

The learning data is stored in the learning-data storing unit 141. In this embodiment, the specific number according to the environmental condition used for prediction is called k2. The section data may be paraphrased as pieces of learning data included in the k2 nearest neighbors. For example, the medium is air, water, ground surfaces, or the like. For example, the power resource is gasoline, batteries, or the like. As described above, the environmental conditions are wind speeds, wind directions, wave speeds, wave heights, and the gradients of roads around the position of the moving object as well as the amount of remaining gasoline or battery charge and the like.

The generation unit 151 uses a preset number for k2. This number is set, for example, such that the difference between the response variable calculated based on the kernel regression function generated by using k2 nearest neighbors and the response variable calculated based on the kernel regression function generated by using all pieces of the learning data on the movement of the moving object is smaller than or equal to a specified value. For example, the generation unit 151 is allowed to set the value of k2 to a value from 1 to n, but uses k2 set to a value determined by tuning performed to achieve high-speed calculation without sacrificing estimation accuracy. For example, in some cases, the generation unit 151 sets k2 to a value smaller than or equal to 100 even in a case where the number of pieces of learning data exceeds 10,000. Thus, in the embodiment, the number of pieces of data used to generate the kernel function is very small, and this makes it possible to achieve high-speed calculation in kernel regression.

The generation unit 151 generates a kernel regression function, using k2 nearest neighbors which are a specific number of data pieces selected from the learning data on the movement of the moving object in ascending order of the Euclidean distance to the prediction data piece indicating an environmental condition used for prediction. The environmental condition used for prediction may be paraphrased as an explanatory variable in a regression model for the prediction data. For example, the generation unit 151 calculates the Euclidean distance between the explanatory variable of the prediction data and each explanatory variable in the learning data.

Figure 2:
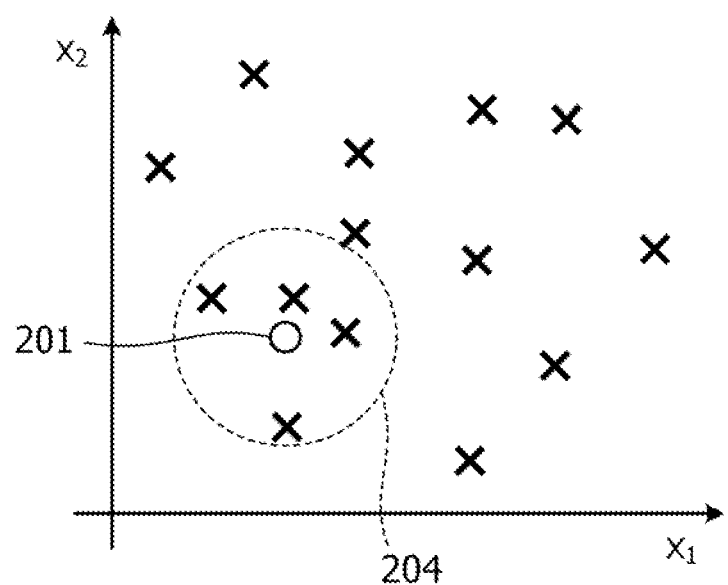
FIG. 2 is a diagram for explaining k2 nearest neighbors in an explanatory-variable space.

FIG. 2 is a diagram for explaining k2 nearest neighbors in an explanatory-variable space. The symbols $x_1$ and $x_2$ represent items of the explanatory variables. To make the explanation simple, it is assumed that the explanatory variables are two-dimensional, but in reality, the explanatory variables may be three-dimensional or higher. The circle mark in FIG. 2 represents an explanatory variable 201 in the prediction data. The symbols "x" in FIG. 2 represent explanatory variables in the learning data. The region denoted by 204 in FIG. 2 indicates k2 nearest neighbors of the explanatory variable 201.

A higher accuracy in prediction with the kernel regression function leads to a higher accuracy in anomaly detection. Considering a physical characteristic that if environmental conditions are close to each other, the performance regarding the movement of the moving object is close, the explanatory variables of the k2 nearest neighbors are expected to contribute to improvement in the prediction accuracy.

Pieces of the learning data included in the k2 nearest neighbors are represented as Expression (1).

$$x_{i_1}, x_{i_2}, \ldots, x_{i_{k2}} \tag{1}$$

The k2 nearest neighbors, $X_{k2}$, are expressed as Expression (2). Here, $j=1, 2, \ldots, k2$.

$$X_{k2} \ni x_{i_j} \tag{2}$$

[Process in Learning Phase]

First, a description is given of the process in each unit of the detection apparatus 10 in the learning phase. In the learning phase, the generation unit 151 calculates a kernel K $(x, x_i)$ in advance for each piece of the learning data and stores the calculation results in the kernel-information storing unit 142. In this process, the generation unit 151 may calculate the kernels by a method the same as or similar to k-nearest-neighbor crossover kernel regression that has been known. For example, the generation unit 151 calculates a kernel for $x_i$ from the explanatory variables in the learning data included in the k nearest neighbors of $x_i$. Note that here, k is a natural number set separately from k2 used in k2 nearest neighbors.

[Preparation Phase]

Next, a description is given of the process in each unit of the detection apparatus 10 in the preparation phase. Note that because each process in the preparation phase uses the learning data, those processes may be included in the learning phase. In the preparation phase, the generation unit 151 generates a kernel regression function expressed by Expression (3), using the kernel calculated in the learning phase.

$$\hat{f}(x) = \frac{\sum_{x_{i_j} \in X_{k2}} K(x, x_{i_j}) y_{i_j}}{\sum_{x_{i_j} \in X_{k2}} K(x, x_{i_j})} \tag{3}$$

Figure 3:
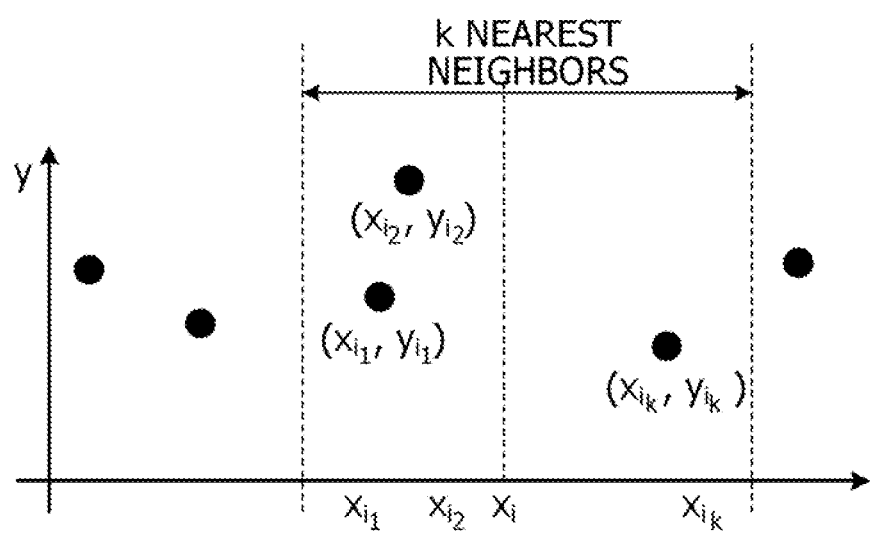
FIG. 3 is a diagram for explaining k nearest neighbors of learning data.

The k nearest neighbors are determined as illustrated in FIG. 3, using an explanatory variable $x_i$ in the learning data. FIG. 3 is a diagram for explaining k nearest neighbors of the learning data. As illustrated in FIG. 3, the explanatory variables of k nearest neighbors of the learning data are included within a certain range centered on the explanatory variable $x_i$.

As described above, the generation unit 151 generates a regression function according to k-nearest-neighbor crossover kernel regression that derives, based on learning log data having values of a first item and values of a second item regarding the movement of the moving object, an estimation value for a value of the second item from a value of the first item. The learning log data is an example of first log data. The explanatory variable $x_i$ is an example of the first item. The response variable $y_i$ is an example of the second item. The generation unit 151 is capable of generating a kernel function from k nearest neighbors (where k is a positive integer) for each value of the first item in the learning log data which is uniform and dense.

The generation unit 151 also calculates a confidence-interval width for each piece of the learning data, using Expression (4). It may be said that the confidence-interval width is the standard deviation of the prediction value outputted from the kernel regression function.

$$V^p(x_i) = \sqrt{\frac{1}{k} \sum_{j=1}^{k} (y_{i,j} - \hat{f}(x_i))^2} \tag{4}$$

Note that generation of a function may be simply calculating and storing the parameters to be used in calculation using the function. For example, a configuration may be possible in which the generation unit 151 simply calculates the kernel K $(x, x_i)$ and the confidence interval $V^p(x_i)$ for each piece of the learning data as the parameters used in Expression (3) and stores the results in the storing unit 14.

The determination unit 152 determines a standard for calculating a specified threshold regarding an estimation value from values of the first item, based on the confidence-interval width of the estimation value and the regression function for each value of the first item. For example, the determination unit 152 determines, as a standard, a function that multiplies an approximate value of the standard deviation of an estimation value by a constant.

First, the determination unit 152 may set the minimum $\delta_i$ that satisfies Expression (5) to the constant. Here, $y_{i,1}, y_{i,2}, \ldots$, and $y_{i,k}$ are the response variables to the k nearest neighbors of $x_i$: $x_{i,1}, x_{i,2}, \ldots, x_{i,k} \in X_{ik}$.

$$|\hat{f}(x_i) - y_{i,j}| \leq \delta_i V^p(x_i) (j=1, \ldots, k) \tag{5}$$

The determination unit 152 determines a threshold function $\mu(x)$ as in Expression (6).

$$\mu(x) = \sqrt{\frac{\sum_{x_{i_j} \in X_{k2}} K(x, x_{i_j}) \delta_{i_j} V^p(x_{i_j})^2}{\sum_{x_{i_j} \in X_{k2}} K(x, x_{i_j})}} \tag{4}$$

The threshold function $\mu(x)$ is an example of a standard for calculating the threshold. The threshold function $\mu(x)$ is equivalent to the confidence-interval width $\hat{V}^p(x)$ of a point x (hereinafter, ^A means a symbol A having ^ right over A). According to Expression (4), $V^p(x)$ corresponds to the standard deviation. Since the confidence-interval width $\hat{V}^p(x)$ is generated from $V^p(x)$, $\hat{V}^p(x)$ may also be treated as one corresponding to the standard deviation.

With this, it is seen that the threshold function $\mu(x)$ in Expression (6) is the standard deviation multiplied by a constant. Alternatively, $\delta_i$ may be a predetermined constant. For example, in the case where $\delta_i$ is set to 4, the threshold function μ(x) expresses the range of what is called 4σ (−4σ to +4σ), centered on the average, which is statistically meaningful.

[Detection Phase]

The judgment unit 153 calculates the difference between an estimation value of the second item derived by the regression function from a value of the first item included in the log data for judgement, which has values of the first item and values of the second item, and an actually measured value of the second item included in the log data for judgement. The log data for judgement is an example of second log data. The judgment unit 153 judges whether the moving object has an anomaly based on whether the calculated difference is smaller than or equal to the threshold calculated from the value of the first item based on the standard.

For example, the judgment unit 153 first calculates an estimation value of the response variable of the prediction data based on the kernel regression function. The judgment unit 153 substitutes the explanatory variable of the prediction data for x in Expression (3) to calculate the prediction value.

x' represents an explanatory variable of the prediction data and y' represents the response variable of the prediction data. Then, the judgment unit 153 performs evaluation with Expression (7) using the regression function expression of Expression (3) and the threshold function of Expression (6).

$$|\tilde{f}(x')-y'|>\mu(x') \quad (7)$$

In the case where Expression (7) holds, the judgment unit 153 judges that there is an anomaly. That Expression (7) holds means that the difference between the prediction value and the actually measured value exceeds the threshold. In the case where Expression (7) does not hold, the judgment unit 153 judges that there is not an anomaly. That Expression (7) does not hold means that the difference between the prediction value and the actually measured value is smaller than or equal to the threshold. The judgment unit 153 outputs an anomaly flag or a normality flag indicating the judgement result.

Figure 4:
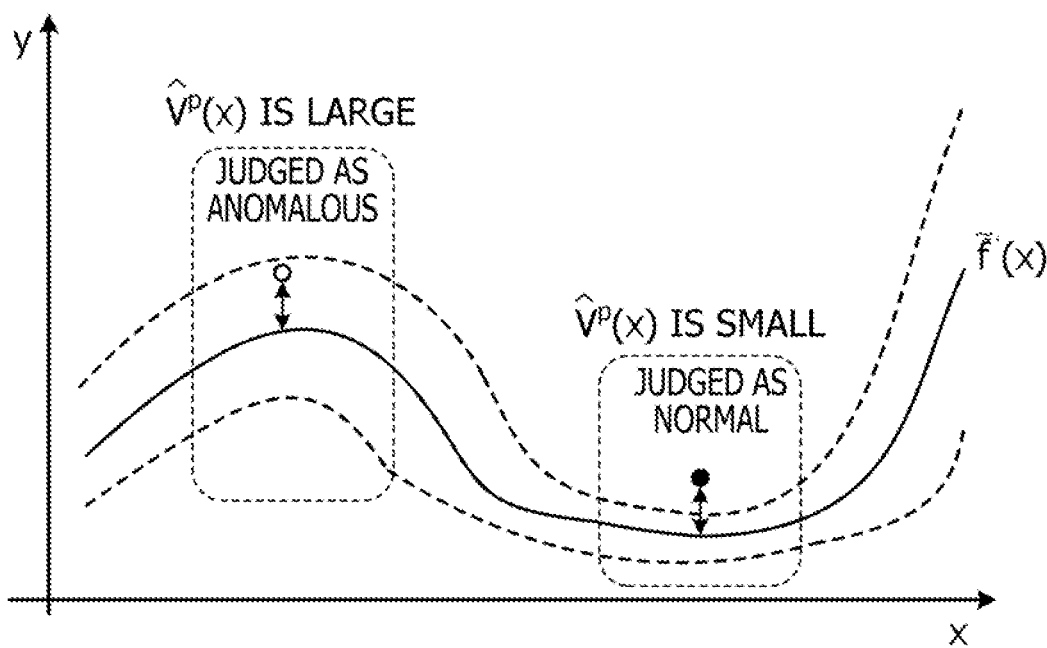
FIG. 4 is a diagram for explaining a confidence-interval width and a threshold function.

The confidence-interval width and the threshold function are described with reference to FIG. 4. The confidence-interval width $\hat{V}^P(x)$ is equivalent to the threshold function μ(x). As illustrated in FIG. 4, the confidence-interval width $\hat{V}^P(x)$ changes in its magnitude according to x. This means that the threshold for anomaly detection changes according to x, and thus, it is possible to set an appropriate threshold in this embodiment.

[Detection System]

Figure 6:
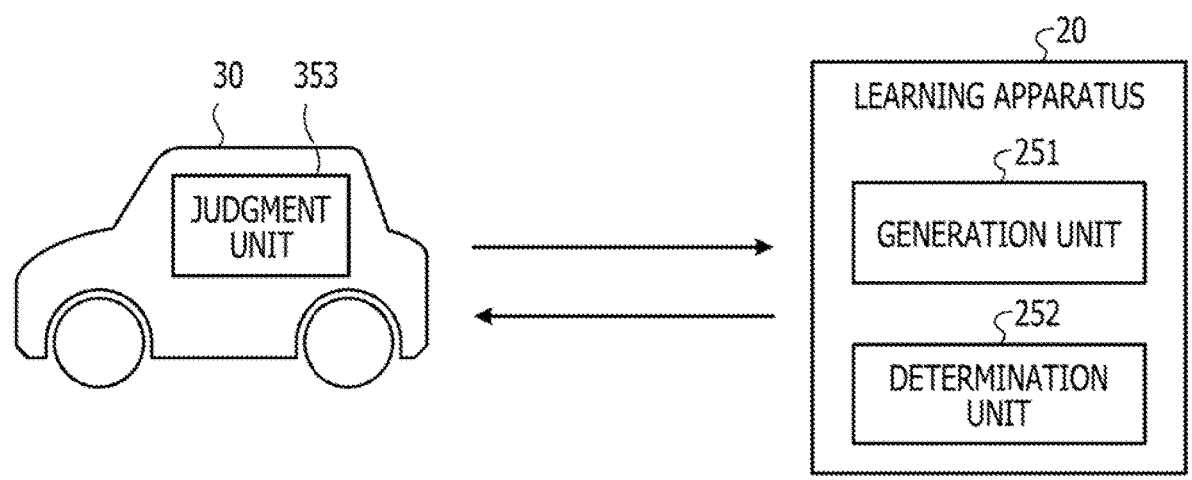
FIG. 6 is a diagram for explaining a configuration example of a detection system.

A moving object may have an anomaly detection function as illustrated in FIG. 6. FIG. 6 is a diagram for explaining a configuration example of a detection system. As illustrated in FIG. 6, the detection system has a learning apparatus 20 including a generation unit 251 and a determination unit 252. The learning apparatus 20 is, for example, a server. The moving object 30 has a judgment unit 353. The moving object 30 is, for example, an automobile.

The generation unit 251, determination unit 252, and judgment unit 353 have functions the same as or similar to those of the generation unit 151, determination unit 152, and judgment unit 153, respectively. Hence, for example, the learning apparatus 20 receives learning data on environmental conditions of the moving object 30 in its normal state and performs the processes for the learning phase and the preparation phase. The moving object receives the kernel regression functions and the threshold functions from the learning apparatus 20, and thereby the moving object 30 is capable of performing the process for the detection phase.

For example, the moving object 30 samples environmental conditions for prediction data, judges whether there is an anomaly at each sampling, and outputs the result in the form of a flag.

[Proof that Threshold Function is Statistic]

In the embodiment, the prediction value is calculated using k2 nearest neighbors, and thereby it is possible to treat the regression function, the confidence-interval width, and the threshold function as related statistics. This is proved as follows.

In the embodiment, first, it is assumed that the environmental condition is a physical model of a continuous system in which the state does not change suddenly due to the environment. It is also assumed that the relation n>>k>k2 holds, where n is the number of pieces of learning data, k is the number of k nearest neighbors, and k2 is the number of k2 nearest neighbors. For example, n=8575, k=30, and k2=8. It is also assumed that the distributions of the learning data and the prediction data obtained from environmental conditions spread uniformly and densely.

Assuming that the explanatory variables in the learning data are represented by $x_i$ (i=1, 2, ..., n), that k nearest neighbors of $x_i$ are represented by $X_{ik}$ ($x_{i,1}$, $x_{i,2}$, ..., $x_{i,k} \in X_{ik}$), and that the response variable values corresponding to $X_{ik}$ are represented by $y_{i,1}$, $y_{i,2}$, ..., $y_{i,k}$, $Y_{ik}$ is defined as $Y_{ik}=\{y_{i,1}, y_{1,2}, ..., y_{i,k}\}$. Assuming that k2 nearest neighbors of $x_i$ are represented by $X_{k2}$ ($x_{i1}$, ..., $x_{ik2} \in x_{k2}$) and that the response variable values corresponding to $X_{k2}$ are represented by $y_{i1}$, ..., $y_{ik2}$, and $Y_{k2}$ is defined as $Y_{k2}=\{y_{i1}, ..., y_{ik2}\}$.

In the case where k converges 2, the Euclidean distance between each set of two points of $X_{ik}$ becomes close to 0 because of the uniform, dense characteristic, and the Euclidean distance between each set of two points of $Y_{ik}$ also becomes close to 0 because of the continuity of the model. In the case where the value of k is small, when it is assumed that min $y_i$=min $y_{i,j}$ ($y_{i,j} \in Y_{ik}$) and that max $y_i$=max $y_{i,j}$ ($y_{i,j} \in Y_{ik}$), the value of max $y_i$−min $y_i$ is also small.

The estimation value of the kernel regression function ~f($x_i$) in Expression (3) is a weighted average of the points of $Y_{k2}$. The expression $(1/k)\Sigma_{j=1}^{k} y_{i,j}$ is the average of the points of $Y_{ik}$. $Y_{k2}$ is included in $Y_{ik}$. Thus, the expressions min $y_i \leq$ ~f($x_i$) and $(1/k)\Sigma_{j=1}^{k} y_{i,j} \leq$ max $y_i$ hold. Note that these expressions do not hold in the case of a nonlinear regression functions of related art that does not use k2 nearest neighbors.

Because max $y_i$−min $y_i$ is a small value, Expression (8-1) holds, and Expression (8-2) also holds. Thus, $V^P(x_i)$ represents the standard deviation. With this, ~f($x_i$) represents the average of $Y_{ik}$, and $V^P(x_i)$ represents the standard deviation of $Y_{ik}$. Note that these also do not hold in the case of a nonlinear regression function of related art that does not use k2 nearest neighbors.

$$\tilde{f}(x_i) \approx \frac{1}{k}\sum_{j=1}^{k} y_{i,j} \quad (8-1)$$

$$V^P(x_i) = \sqrt{\frac{1}{k}\sum_{j=1}^{k}(y_{i,j}-\tilde{f}(x_i))^2} \approx \sqrt{\frac{1}{k}\sum_{j=1}^{k}\left(y_{i,j}-\frac{1}{k}\sum_{j=1}^{k}y_{i,j}\right)^2} \quad (8-2)$$

In the case where the uniform, dense characteristic gradually disappears, when k converges 2, the Euclidean distances of some sets of two points of $X_{ik}$ do not become close to 0. This means that the value of ~f($x_i$) and the value of (1/k) $\Sigma_{j=1}^{k} y_{i,j}$ gradually become different values. Thus, $V^p(x_i)$ gradually becomes a value different from the standard deviation.

[Process Procedure]

Figure 5:
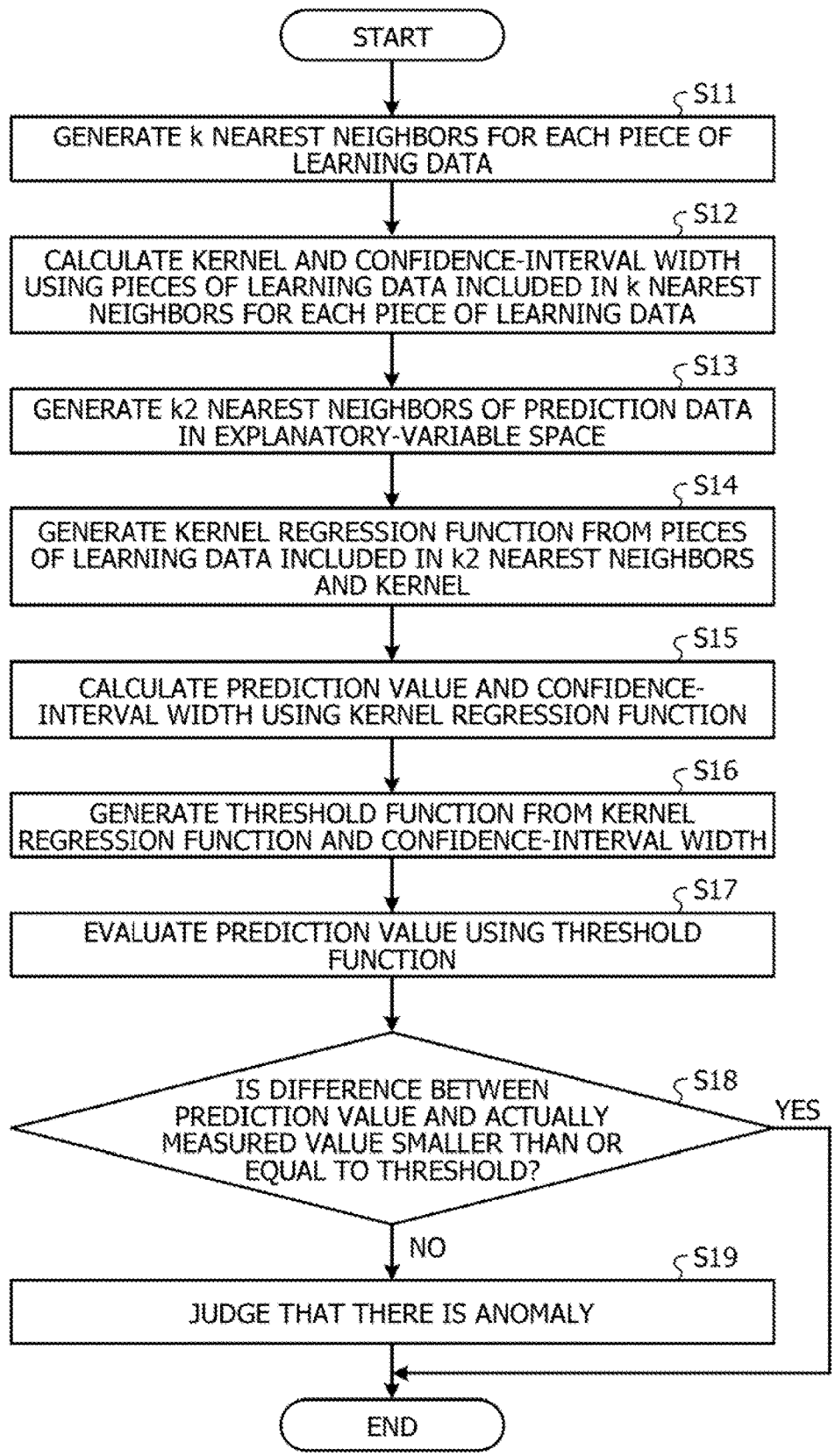
FIG. 5 is a flowchart illustrating a detection process procedure.

Prediction process procedure by the detection apparatus 10 is described with reference to FIG. 5. FIG. 5 is a flowchart illustrating the detection process procedure. As illustrated in FIG. 5, the detection apparatus 10 first generates k nearest neighbors for each piece of the learning data (step S11). Next, the detection apparatus 10 calculates a kernel and a confidence-interval width for each piece of the learning data, using the pieces of learning data included in the k nearest neighbors (step S12).

The detection apparatus 10 generates k2 nearest neighbors of the prediction data in the explanatory-variable space (step S13). The detection apparatus 10 generates a kernel regression function from the pieces of learning data and kernels included in the k2 nearest neighbors (step S14). The detection apparatus 10 then uses the kernel regression function to calculate a prediction value and the confidence-interval width (step S15). The detection apparatus 10 also generates a threshold function from the kernel regression function and the confidence-interval width (step S16).

The detection apparatus 10 uses the threshold function to evaluate the prediction value calculated by using the kernel regression function (step S17). In this process, in the case where the difference between the prediction value and the actually measured value is not smaller than or equal to the threshold (No at step S18), the detection apparatus 10 judges that there is an anomaly (step S19). In the case where the difference between the prediction value and the actually measured value is smaller than or equal to the threshold (Yes at step S18), the detection apparatus 10 judges that there is not an anomaly.

Effects

As described above, the detection apparatus 10 generates the regression function according to k-nearest-neighbor crossover kernel regression that derives an estimation value for a value of the second item from a value of the first item, based on the learning log data having values of the first item and values of the second item regarding the movement of the moving object. The detection apparatus 10, based on the confidence-interval width of the estimation value and the regression function for each value of the first item, determines a standard for calculating a specified threshold regarding the estimation value from the value of the first item. The detection apparatus 10 calculates the difference between the estimation value of the second item and the actually measured value of the second item. The estimation value of the second item is derived by the regression function from a value of the first item in the log data for judgement, which has values of the first item and values of the second item. The actually measured value of the second item is included in the log data for judgement. Then, the detection apparatus 10 judges whether the moving object has an anomaly based on whether the calculated difference is smaller than or equal to the threshold calculated from the value of the first item based on the standard. Thus, it is possible for the detection apparatus 10 to change the threshold for anomaly detection according to the value of the explanatory variable. Thus, this embodiment makes it possible to set an appropriate threshold and improve the accuracy in anomaly detection.

The detection apparatus 10 generates a kernel function from k nearest neighbors (where k is a positive integer) for each value of the first item in the learning log data. Since the detection apparatus 10 calculates the kernel from k nearest neighbors in this way, the calculation time is short.

The detection apparatus 10 makes judgment using an estimation value derived from the values of the first item included in the k2 nearest neighbors (where k2 is a positive integer that satisfies k>k2) and the kernel function for each value of the first item in the learning log data. This makes it possible to regard the confidence-interval width as the standard deviation and set a threshold based on the standard deviation.

The detection apparatus 10 determines, as a standard, a function that multiplies an approximate value of the standard deviation of the estimation value by a constant. Setting the constant, for example, to 4 or the like gives the threshold a statistical meaning.

Although in the above embodiment, the value of k2 is set in advance or changed according to the confidence-interval width, the detection apparatus 10 may set k2 in a different way. For example, the detection apparatus 10 may receive designation of the value of k2 by the user at any time. Alternatively, the value of k2 may be set as large as possible within a range in which the calculation time does not exceed its upper limit set in advance.

[System]

Processing procedures, control procedures, specific names, and information including various kinds of data and parameters used in the aforementioned descriptions and drawings may be changed in any manner unless otherwise specified. The specific examples, distributions, numerical values, and the like described in the embodiment are merely examples, and may be changed as appropriate.

The components of each apparatus illustrated in the drawings are functional conceptual ones, and do not necessarily have to be physically configured as illustrated in the drawings. This means, for example, that specific forms of separation and integration of the apparatuses are not limited to those illustrated in the drawings. For example, all or some of the apparatuses may be separated or integrated functionally or physically in given units depending on various loads, usage conditions, and so on. All or any part of processing functions performed by each apparatus may be implemented by a central processing unit (CPU) and a program analyzed and executed by the CPU or alternatively may be implemented as hardware by wired logic circuits.

[Hardware]

Figure 7:
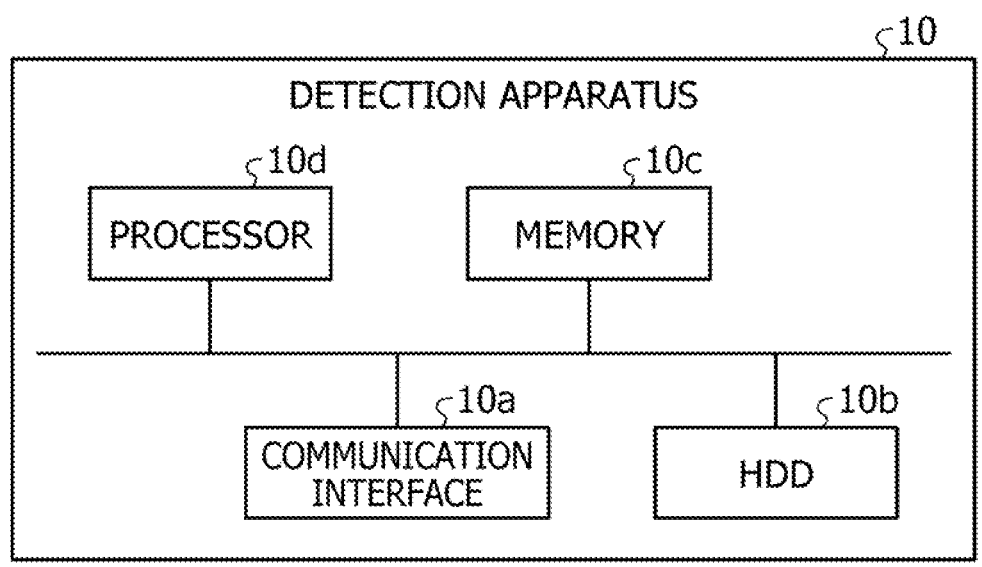
FIG. 7 is a diagram for explaining a hardware configuration example.

FIG. 7 is a diagram for explaining a hardware configuration example. As illustrated in FIG. 7, the detection apparatus 10 includes a communication interface 10a, hard disk drive (HDD) 10b, memory 10c, and processor 10d. The components illustrated in FIG. 7 are coupled to one another by a bus or the like.

The communication interface 10a is a network interface card or the like and communicates with other servers. The HDD 10b stores a program and a database (DB) for causing the functional units illustrated in FIG. 1 to operate.

The processor 10d executes a process for implementing the functions illustrated in, for example, FIG. 1 by reading from the HDD 10b or the like the program for executing processing the same as or similar to that of the processing units illustrated in FIG. 1 and loading the program into the memory 10c. For example, this process implements functions the same as or similar to those of the processing units included in the detection apparatus 10. For example, the processor 10d reads, from the HDD 10b or the like, a program that has functions the same as or similar to those of the generation unit 151, determination unit 152, and judgment unit 153. The processor 10d executes the process for executing processing the same as or similar to that of the generation unit 151, determination unit 152, and judgment unit 153.

Thus, the detection apparatus 10 operates as an information processing device that executes the detection method by reading and executing a program. The detection apparatus 10 may also implement functions the same as or similar to those in the embodiment described above by reading the program from a recording medium with a medium reading device and executing the program thus read. The program described in these other embodiments is not limited to being executed by the detection apparatus 10. For example, the present disclosure may also be applicable in the case where the program is executed by another computer or a server or in the case where the program is executed by computers or servers working in cooperation with one another.

This program may be distributed via a network such as the Internet. The program may be recorded on a computer-readable storage medium such as a hard disk, a flexible disk (FD), a compact disc read-only memory (CD-ROM), a magneto-optical disk (MO), or a Digital Versatile Disc (DVD) and may be executed by being read from the storage medium by a computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage medium having stored therein an anomaly detection program for causing a computer to execute a process, the process comprising:
generating, based on first log data having values of a first item and values of a second item regarding a movement of a moving object, a regression function according to k-nearest-neighbor crossover kernel regression, the regression function being configured to derive an estimation value for a value of the second item from a value of the first item;
determining a standard to calculate a specified threshold regarding the estimation value from the value of the first item, based on a confidence-interval width of the estimation value and the regression function for each value of the first item; and
judging whether the moving object has an anomaly, based on whether a difference between an estimation value of the second item and an actually measured value of the second item is smaller than or equal to a threshold calculated from the value of the first item based on the standard, the estimation value of the second item having been derived by the regression function from a value of the first item in second log data having values of the first item and values of the second item, the actually measured value of the second item being included in the second log data.

2. The storage medium according to claim 1, wherein
the generating generates a kernel function from k nearest neighbors for each value of the first item in the first log data, k representing a positive integer, and
the judging uses values of the first item included in k2 nearest neighbors and the estimation value derived by the kernel function for each value of the first item in the first log data, k2 representing a positive integer satisfying k>k2.

3. The storage medium according to claim 2, wherein
the determining determines, as the standard, a function that multiplies an approximate value of the standard deviation of the estimation value by a constant.

4. An anomaly detection method performed by a computer, the method comprising steps of:
generating, based on first log data having values of a first item and values of a second item regarding a movement of a moving object, a regression function according to k-nearest-neighbor crossover kernel regression, the regression function being configured to derive an estimation value for a value of the second item from a value of the first item;
determining a standard to calculate a specified threshold regarding the estimation value from the value of the first item, based on a confidence-interval width of the estimation value and the regression function for each value of the first item; and
judging whether the moving object has an anomaly, based on whether a difference between an estimation value of the second item and an actually measured value of the second item is smaller than or equal to a threshold calculated from the value of the first item based on the standard, the estimation value of the second item having been derived by the regression function from a value of the first item in second log data having values of the first item and values of the second item, the actually measured value of the second item being included in the second log data.

5. An anomaly detection apparatus comprising:
a memory, and
a processor coupled to the memory and configured to:
generate, based on first log data having values of a first item and values of a second item regarding a movement of a moving object, a regression function according to k-nearest-neighbor crossover kernel regression, the regression function being configured to derive an estimation value for a value of the second item from a value of the first item;
determine a standard to calculate a specified threshold regarding the estimation value from the value of the first item, based on a confidence-interval width of the estimation value and the regression function for each value of the first item; and
judge whether the moving object has an anomaly, based on whether a difference between an estimation value of the second item and an actually measured value of the second item is smaller than or equal to a threshold calculated from the value of the first item based on the standard, the estimation value of the second item having been derived by the regression function from a value of the first item in second log data having values of the first item and values of the second item, the actually measured value of the second item being included in the second log data.

* * * * *